United States Patent [19]
Haderle et al.

[11] Patent Number: 4,933,848
[45] Date of Patent: Jun. 12, 1990

[54] METHOD FOR ENFORCING REFERENTIAL CONSTRAINTS IN A DATABASE MANAGEMENT SYSTEM

[75] Inventors: Donald J. Haderle, Los Gatos; Julie A. Watts, San Jose, both of Calif.

[73] Assignee: International Business Machines Corporation, Armonk, N.Y.

[21] Appl. No.: 219,512

[22] Filed: Jul. 15, 1988

[51] Int. Cl.$^5$ .............................................. G06F 9/00
[52] U.S. Cl. .................................. 364/300; 364/200; 364/282.1; 364/283.4
[58] Field of Search ..................... 364/200, 300, 900

[56] References Cited

U.S. PATENT DOCUMENTS

| | | | |
|---|---|---|---|
| 4,627,019 | 12/1986 | Ng | 364/900 |
| 4,631,664 | 12/1986 | Bachman | 364/300 X |
| 4,769,772 | 9/1988 | Dwyer | 364/300 |
| 4,811,207 | 3/1989 | Hikita et al. | 364/300 X |

OTHER PUBLICATIONS

E. Simon et al., "Design and Implementation of an Extendable Integrity Subsystem", Proceedings ACM Sigmod Record, vol. 14, No. 2, pp. 9-17 (1984).

E. Simon et al., "Efficient Algorithms for Integrity Control in a Database Machine", IEEE Proceedings—Trends and Applications 1984, pp. 53-59.

A. Dogac et al., "The Design and Implementation of an Integrity Subsystem for the Relational DBMS RAP", Proceedings 4th International Conference on Entity-Relationship Approach, IEEE, pp. 295-302 (1985).

Primary Examiner—Raulfe B. Zache
Attorney, Agent, or Firm—Pryor A. Garnett

[57] ABSTRACT

A method is disclosed for deferring enforcement of referential constraints in large-scale data base operations such as the population or loading of relational tables 10, 12. First, the new rows are loaded in a Data Load phase 24 into the tables, and information on the new rows and their constraints is extracted and sorted 26 into a sorted key data set 68. Any primary indexes 22 required for constraint checking are then updated 28 using the sorted key data set. The new rows are then checked 70 for constraint violations, such violations are rectified 72 to restore the table's referential integrity, and a deletion data set 80 is produced. The deletion data set is merged and sorted 86 with row information 53 stored during loading, and the result is used to copy 88 the new rows violating referential constraints to a separate discard data set 48 where they can be corrected and reloaded into the table. Finally, an error summary report 36 is generated for use in correcting the discard data set.

14 Claims, 9 Drawing Sheets

LOAD UTILITY ERROR SUMMARY REPORT

| ERROR SEVERITY | INPUT RECORD | DISCARD RECORD | TABLE NAME | RELATIONSHIP NAME | RELATED ERROR |
|---|---|---|---|---|---|
| PRIMARY | 16 | 1 | SYSADM.T26 | R23 | |
| PRIMARY | 18 | 2 | SYSADM.T26 | R23 | |
| PRIMARY | 20 | 3 | SYSADM.T26 | R23 | |
| PRIMARY | 22 | 4 | SYSADM.T26 | R23 | |
| PRIMARY | 32 | 5 | SYSADM.T27 | R24 | |
| ⋮ | | | | | |
| SECONDARY | 34 | 6 | SYSADM.T28 | | 16 |
| SECONDARY | 36 | 7 | SYSADM.T28 | | 22 |

FIG. 9

METHOD FOR ENFORCING REFERENTIAL CONSTRAINTS IN A DATABASE MANAGEMENT SYSTEM

BACKGROUND OF THE INVENTION

1. Technical Field

This invention relates to data base management systems, and more particularly to the referential integrity of data in such systems.

2. Description of the Prior Art

A data base management system is a computer system for recording and maintaining data. In a relational data base management system, data is stored in "tables" which can be pictured as having horizontal rows and vertical columns. Each row in an employee table, for example, would represent information about one employee. Each column of that row would represent a different attribute of the employee—the employee's name, address, department, etc. The Database 2 product of the International Business Machines Corporation (IBM) is a good example of a typical relational data base management system.

A characteristic of data stored in relational tables is whether or not the data possesses "referential integrity". Referential integrity refers to the logical consistency of stored data. For example, in a data base consisting of an employee table and a department table, the data would lack referential integrity if an employee was recorded as belonging to a department that did not exist in the department table. This requirement upon the data is called a "referential constraint", and constrains the value of departments in the employee table to those values that appear in the department table. The values that appear in the department table are unconstrained. Constrained values are termed "foreign keys". Unconstrained values are termed "primary keys".

A goal of relational data base management systems is to ensure the referential integrity of the data placed into the tables it manages. This is known as referential constraint enforcement. The prior art teaches the enforcement of referential constraints on a statement-by-statement or a transaction-by-transaction basis (transactions comprising one or more statements). In these methods, the constraints are enforced in the same order as the data base records are "manipulated", e.g., added (inserted), updated (changed), deleted, etc. In large-scale data base operations which manipulate many records, the prior art methods are unable to reorganize the order in which the constraints are enforced, and therefore perform very inefficiently.

SUMMARY OF THE INVENTION

One object of this invention is to provide a method for enforcing referential constraints during large-scale data base operations.

Another object of this invention is to enforce referential constraints in an efficient order so as to reduce the time required.

Yet another object of this invention is to separately store records violating referential constraints outside the data base for easy correction and subsequent loading.

The invention is a method for enforcing referential constraints in data base management systems. First, at least two records or rows of a table are manipulated, such as by loading them into the table. Information relating to the manipulated rows and their referential constraints is stored, and then placed in order with constraint information on primary keys preceding information on foreign keys. Finally, the referential constraints on the manipulated records are enforced using the ordered constraint information.

Other features and advantages of this invention will be seen from the following detailed description of the preferred embodiment, taken in conjunction with the accompanying drawings.

DETAILED DESCRIPTION OF THE PREFERRED EMBODIMENT

Figure 1:
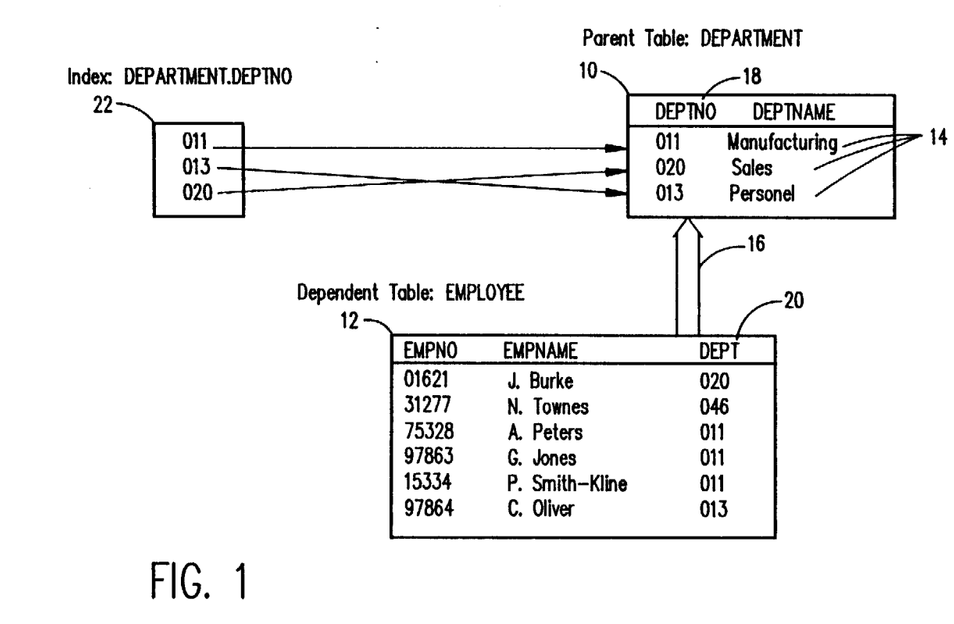
FIG. 1 illustrates a relational data base including a referential constraint between the indexed parent table DEPARTMENT and the dependent table EMPLOYEE.

FIG. 1 shows an illustrative relational data base having a parent table DEPARTMENT 10 and a dependent table EMPLOYEE 12. The DEPARTMENT table 10 has two columns, DEPTNO (department number) and DEPTNAME (department name), and separate rows 14 for three departments. The EMPLOYEE table 12 has three columns: EMPNO (employee number), EMPNAME (employee name), and DEPT (department) 23. The six rows of the EMPLOYEE table 12 contain the employee numbers, names, and departments of the six employees of this data base. The tables 10, 12 are related by a referential constraint 16 between their respective columns DEPTNO and DEPT that contain department numbers. The department number column DEPTNO in the parent table 10 is known as the "primary key" 18 of the constraint 16. The department number column DEPT in the dependent table 12 is known as the "foreign key" 20 of the constraint 16.

A data row in a dependent table, here EMPLOYEE 12, possesses referential integrity with respect to a constraint if its foreign key value exists as a primary key value in some row of the parent table, here DEPARTMENT 10. In FIG. 1, the first row (J. Burke) of table EMPLOYEE 12 possesses referential integrity, but the second row (N. Townes) violates the referential constraint 16 because there is no row in the DEPARTMENT table 10 with department number DEPTNO equal to "046".

FIG. 1 also shows an index DEPARTMENT.DEPTNO 22 over the DEPTNO column 14 of the DEPARTMENT table 10. Indexes are commonly used in data processing systems to quickly locate a data row given its key, a key being a portion of the row's data that is replicated in order in the index. Data base indexes are somewhat analogous to book indexes, which allow one to quickly locate instances of words or phrases in the books. An index over a primary key is termed a primary index—and the index 22 of FIG. 1 is such a primary index.

Figure 3:
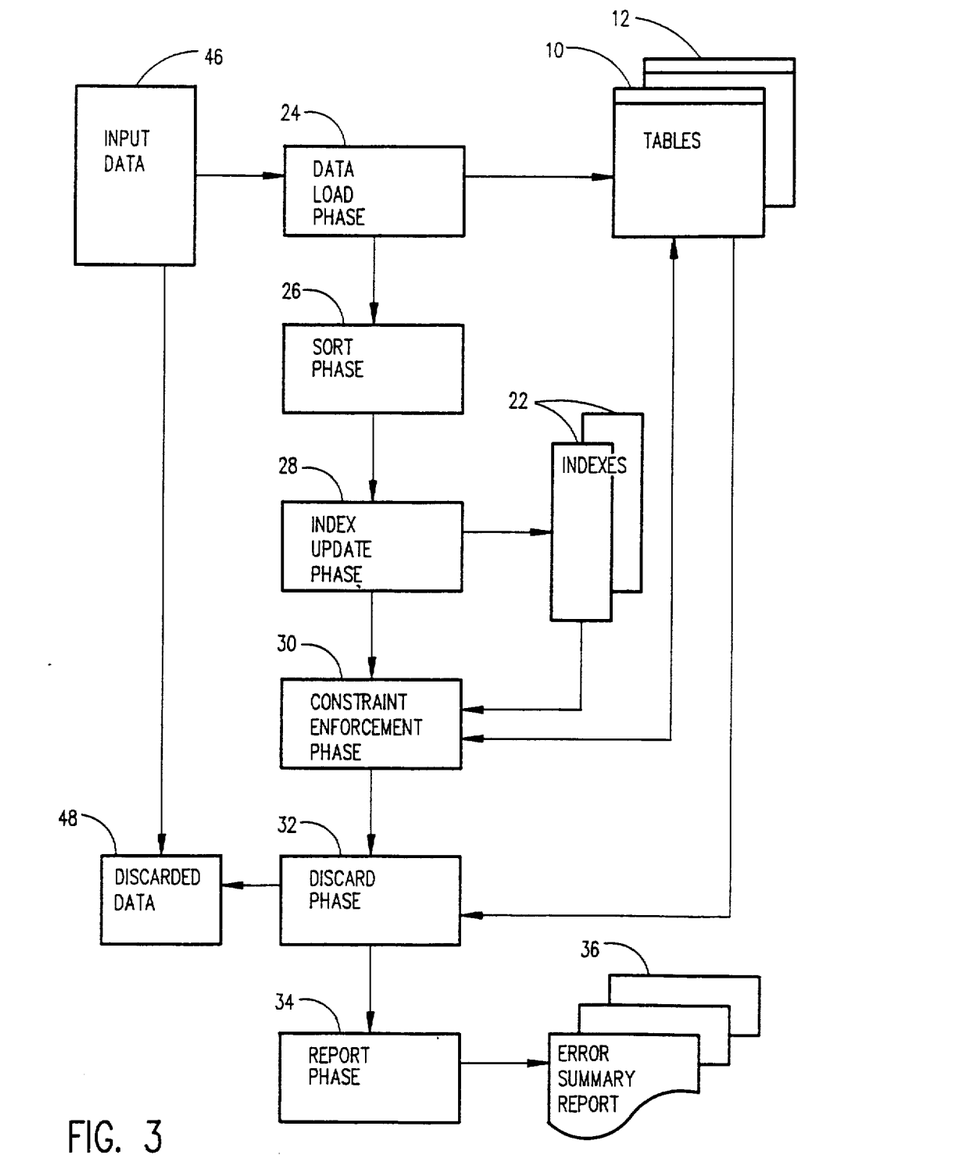
FIG. 3 is an overall schematic view of the preferred embodiment of the method of this invention.

The major phases of the preferred embodiment of this method are shown schematically in FIG. 3. In the Data Load phase 24, all input data rows or records are placed in their target tables 10, 12 without regard to referential integrity constraints. Foreign key values and control information are extracted during the Data Load phase 24 to allow constraint checking to be performed after the tables 10, 12 have been loaded. Index key values are also extracted during the Data Load phase 24. In the Sort phase 26, the key values and attached control information are sorted to allow an optimal order of index updating and constraint enforcement. In the Index Update phase 28, the primary indexes 22 are updated to include the new input data, using the sorted key values from the Sort phase 26.

In the Enforcement phase 30, the sorted foreign key values are evaluated against the contents of the appropriate primary indexes 22 to determine if any input data rows introduced by the Data Load phase 24 cause referential integrity constraint violations. In the Discard phase 32 rows causing referential constraint violations, and new rows which are descendents of rows causing such violations are deleted. At the end of the Discard phase 32 the tables 10, 12 again possess referential integrity. Finally, the Report phase 34 prepares a summary report 36 of the rows deleted during the Discard phase 32.

In the descriptions of these phases which follow, the level of detail provided for each phase is commensurate with its role in the constraint enforcement process. Pseudocode is provided where it lends clarification.

The method is preferably used in the environment of the Database 2 product in which referential constraints are stored in relationship descriptors, particularly during the loading of data into the system's tables, an operation known as "populating" the tables. To efficiently populate tables with large amounts of data, relational data base management systems generally provide batch load facilities. Input data is usually presented to such a facility in an input file or data set, and the facility loads the data into tables according to instructions provided in the facility's command syntax. The batch load facility of IBM's Database 2 product is the LOAD utility.

Figure 2:
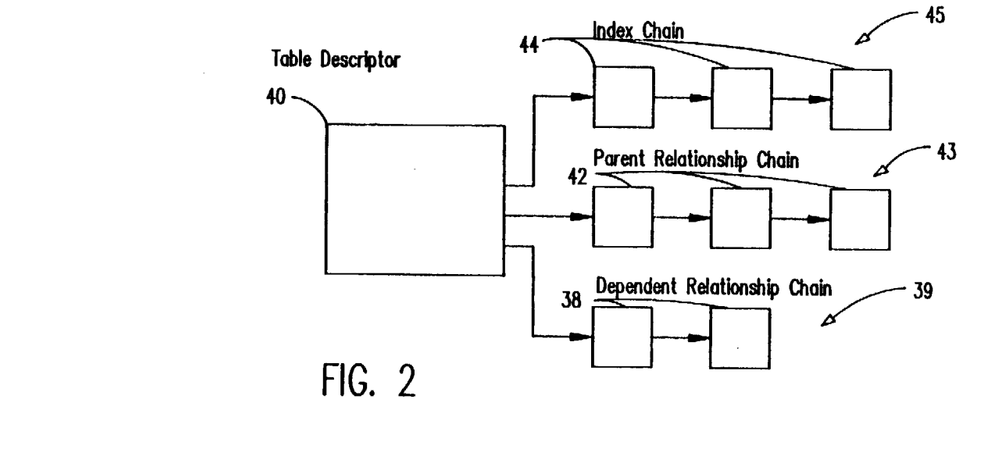
FIG. 2 schematically shows the two chains of referential constraints for a table, one chain for constraints in which the table is a parent, and the other chain for constraints in which the table is a dependent.

Referring to FIG. 2, a referential constraint 16 affecting a table is internally represented in Database 2 by a relationship descriptor. A relationship descriptor contains information identifying the parent and dependent tables of the relationship, the relationship's keys, the primary index that supports the relationship, etc. All the relationship descriptors 38 that represent relationships in which a table participates as a dependent are connected into a dependent relationship chain 39 anchored to a table descriptor 40 used to internally represent the table. Similarly, all the relationship descriptors 42 that represent relationships in which a table participates as a parent are connected into a parent relationship chain 43 anchored off the table's descriptor 40.

An index 22 is similarly represented in Database 2 by an index descriptor 44 which contains information identifying the key column(s) of the index, the ascending or descending nature of the index, etc. All index descriptors 44 that represent indexes over a given table are connected into an index chain 45 anchored to that table's descriptor 40.

The Data Load Phase 24

As seen in the detailed schematic diagram of FIG. 3, during the Data Load phase 24, records from the input data set 46 are loaded into their target tables 10, 12 without regard to referential integrity constraint violations. As each input data record 46 is loaded, information is extracted and placed into work data sets. The work data sets are temporarily created and used during the LOAD operation, and are discarded when the operation is completed.

Two types of information are extracted from the input data records 46: key information and mapping information. Key information drives the referential integrity constraint checking that occurs in the subsequent Enforcement phase 30. It also drives the updating of indexes 22 defined over the loaded tables 10, 12. Mapping information is used in the Discard phase 32 to copy input data set records responsible for constraint violations to a discard data set 48.

The Key Data Set 50

Figure 4:
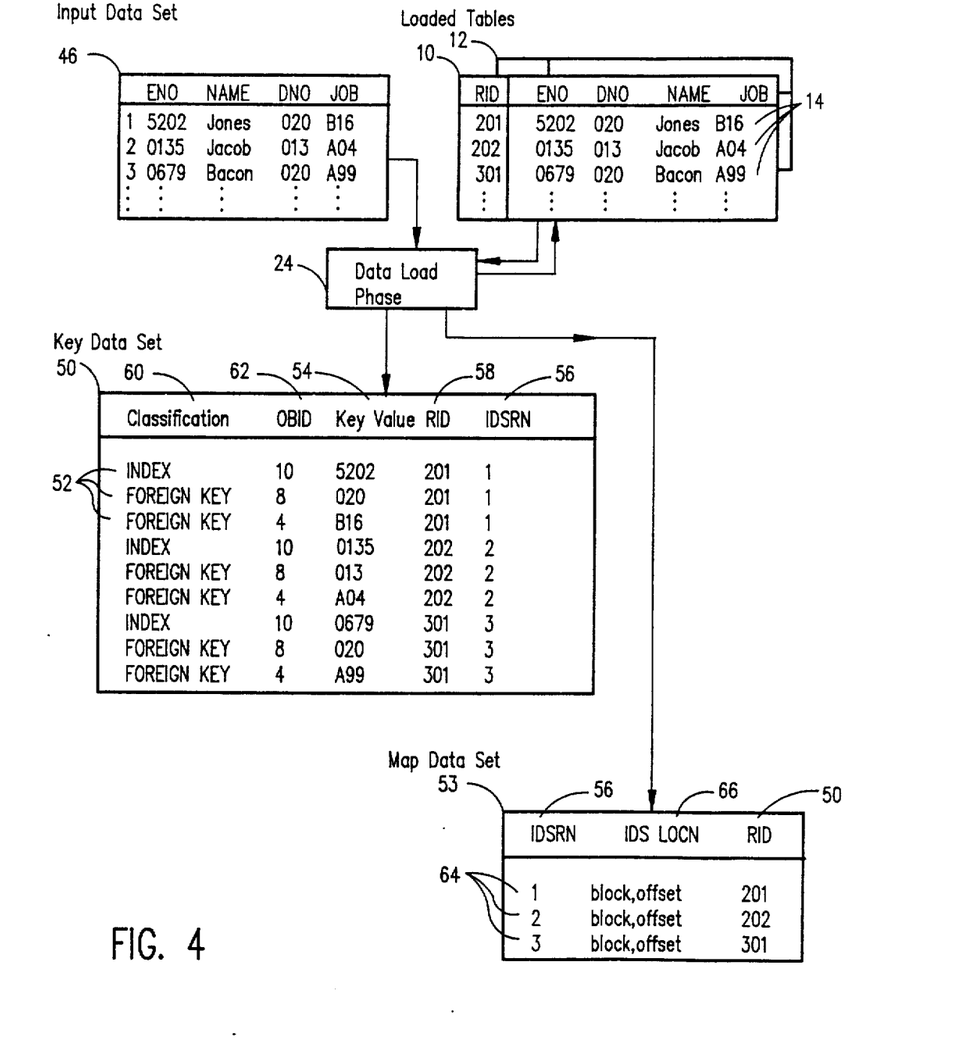
FIG. 4 shows the schematic details of the data load phase of FIG. 3.

Key information is placed in the key work data set 50 during the Data Load phase 24. As shown in FIG. 4, when an input data set record 46 is loaded into its table, a key: entry 52 is placed in the key data set 50 for each foreign key or index 22 defined for the table.

FIG. 4 shows a sample input data set 46 and the contents of the resulting key and map data sets 50, 53 after execution of the Data Load phase 24. Concerning the key data set entries 52 shown in FIG. 4, assume that table column ENO is indexed by an index whose internal identification number is 10, table column DNO is the foreign key in a referential constraint whose internal identification number is 8, and table column JOB is the foreign key in a referential constraint whose internal identification number is 4.

Each key entry 52 contains the key value 54 plus additional control information needed during the subsequent phases of the LOAD operation. One item of this control information is the input data set record number (ISDRN) 56, which identifies the cardinal position in the input data set 46 of the record that spawned this key value 54. The table row location (RID) 58 stores the address of the table row 14 at which the input data set record 46 was loaded. The classification 60 identifies the key value 54 as a foreign key, an index key, or both. Finally, the object identifier (OBID) 62 is an internal identification number that identifies for foreign keys the particular relationship in which the key participates, or for index keys the particular index 22 in which the key participates. If a key participates in both an index and a relationship, the OBID identifies only the relationship.

Pseudocode for producing key entries 52 from an input data set 46 and a table 10 is shown in Table 1. Procedural information, such as buffering for performance, etc., has been omitted since it does not pertain to the conceptual task of building key entries.

TABLE 1

| | Pseudocode for Generating Key Data Set |
|---|---|
| 101 | Zero the input data set record counter. |
| 102 | DO UNTIL last input data set record has been read. |
| 103 | Read input data set record. |
| 104 | Increment input data set record counter. |
| 105 | DO FOR each table into which the input data set record is to be loaded |
| 106 | Load data into table. |

TABLE 1-continued

| | Pseudocode for Generating Key Data Set |
|---|---|
| 107 | RID = location at which the data was loaded. |
| 108 | DO FOR each dependent relationship descriptor of the table |
| | /= Construct a foreign key entry =/ |
| 109 | Classification = FOREIGN KEY. |
| 110 | OBID of relationship = the internal identification number in the relationship descriptor (= 8 or 4 in the example of FIG. 4). |
| 111 | Key Value = the portion of the data just loaded into the table column(s) participating in the current dependent relationship |
| 112 | Input data set record number (IDSRN) = the value of the input data record counter. |
| 113 | Table row location (RID) = the value stored in RID above. |
| . | |
| 114 | Write the foreign key entry to the KEY work data set. |
| 115 | END DO FOR each dependent relationship. |
| . | |
| 116 | DO FOR each index descriptor in the table's index descriptor chain. |
| | /= Construct an index key entry =/ |
| 117 | Classification = INDEX. |
| 118 | OBID = the internal indentification number of the index (= 10 in FIG. 4). |
| 119 | Key Value = the portion of the data just loaded into the table column(s) represented in the index's key |
| 120 | Input data set record number (IDSRN) = the value of the input data record counter. |
| 121 | Table row location (RID) = the value stored in RID above. |
| . | |
| 122 | Write the index key entry to the KEY work data set. |
| 123 | END DO FOR each index. |
| . | |
| 124 | END DO FOR each table. |
| 125 | END DO UNTIL all input data records have been read. |

As previously stated, the key information drives the referential integrity constraint checking that occurs in the Enforcement phase 30. It also drives the updating of indexes 22 defined over the loaded tables 10, 12.

The Map Data Set 53

Map information is placed in the map data set 53 during the Data Load phase 24. When an input data set 46 record is loaded into a table 10, 12, a map entry 64 is placed in the map data set 53. Each map entry 64 contains an input data set record number (ISDRN) 56, an input data set record location (IDS LOCN) 66, and a table row location or row ID (RID) 58. The input data set record number 56 again stores the cardinal position in the input data set 46 of the record that was loaded. The input data set record location (IDS LOCN) 66 contains the physical location in the input data set 46 of the record that was loaded. Physical location values are not shown explicitly in FIG. 4, but are generically represented by the phrase 'block,offset'. The table row location (RID) 58 again holds the address of the table row 14 generated from the input data set 46 record.

Pseudocode for producing map entries 64 from an input data set 46 and a table 10 is shown in Table 2.

TABLE 2

| | Pseudocode for Generating Map Data Set |
|---|---|
| 201 | Zero the input data set record counter. |
| 202 | DO UNTIL last input data set record has been read. |
| 203 | Read input data set record. |
| 204 | Increment input data set record counter. |
| 205 | LOCN = block and offset of the input data set record read. |
| 206 | DO FOR each table into which the input data set record is to be loaded |
| 207 | Load data into table. |
| . | |
| | /= Construct a MAP data set entry =/ |
| 208 | IDSRN = the value of the input data record counter. |
| 209 | IDS LOCN = the value stored in LOCN. |
| 210 | RID = location at which the data was loaded. |
| . | |
| 211 | Write the map entry to the MAP work data set. |
| 212 | END DO FOR each table. |
| 213 | END DO UNTIL all input data records have been read. |

As previously indicated, the mapping information is used in copying input data set 46 records responsible for constraint violations into a discard data set 48, as described below.

The Sort Phase 26 The Sort phase 26 performs two functions, which are best discussed by first reviewing the manner by which referential integrity is checked by the method of this invention, with reference again to FIG. 1. This method checks each referential constraint 16 by scanning the primary index 22 of the relationship for an entry matching the foreign key 20 value of the dependent row being checked. If the foreign key 20 value is located in the index 22 on the primary key 18, the dependent row possesses referential integrity with respect to that constraint. Conversely, if the foreign key 20 value is not located in the primary key index, the dependent row violates that constraint.

The point of the above discussion is that primary indexes 22 must be constructed before constraint checking can be performed. This is integral to the deferred enforcement method of this invention. It is a matter of design choice, however, whether the primary indexes 22 are updated during the Data Load phase 24 or during a subsequent phase as is described next.

One role of the Sort phase 26 is to order the entries of the key data set 50 such that index keys are at the beginning of the key data set and foreign keys 20 are at the end. Then, after the key data set 50 is sorted, index keys are encountered first, and can be used to update indexes 22, before foreign keys 20 which must be checked against primary indexes for constraint violations are encountered. Thus, the first role of the Sort phase 26 is to order the key data set 50 entries 52 by their classification field 60.

The second role of the Sort phase 26 is to optimize the deferred enforcement of the referential constraints. This is accomplished by ordering the foreign key entries 20 in the key data set 50 such that they are encountered in an order that optimizes the performance of constraint checking. One of the advantages of the deferred enforcement method is that it allows such optimizations to be performed. However, the deferred method would still achieve constraint enforcement without such an optimization.

Because primary indexes 22 are accessed to check referential constraints, the optimal order of checking constraints will ensure that the necessary index pages on storage once, used for all relevant checking, and then released. This invention optimizes the constraint checking order by sorting the entries 52 of the key data set 50 by classification (INDEX first, then BOTH, then FOREIGN KEY), within classification by the OBID 62 of the relationship or index to which the key applies, and within the OBID by key value 54. That is, OBID 62 and key value 54 are minor sort fields within the major sort field classification 60.

Figure 5:
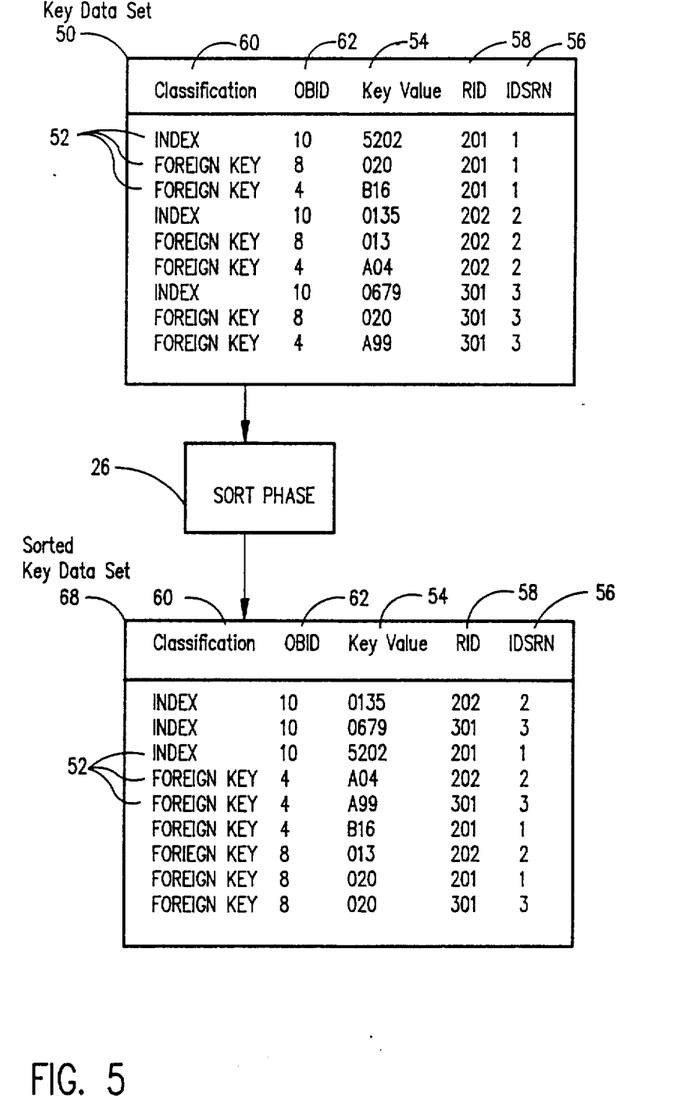
FIG. 5 shows the schematic details of the sort phase of FIG. 3.

The action of the Sort phase 26 upon the key data set 50 of FIG. 4 is shown in FIG. 5. Not illustrated in FIG. 5 are key values which are both index and foreign key values (classification=BOTH). The code for the classification 'BOTH' was chosen to lie between the code for 'INDEX' and the code for 'FOREIGN KEY', so that such "double duty" key values would sort between index only keys and foreign key only keys.

In summary then, the Sort phase 26 sorts the key data set 50 containing all the index and foreign key values of data rows loaded in the Data Load phase 24, into a sorted key data 68 set which is optimal for index updating and efficient checking of referential constraints.

The Index Update Phase 28

During the Index Update phase 28, indexes 22 defined over tables 10, 12 loaded in the Data Load phase 24 are updated to reflect the new data. All indexes defined over the loaded tables 10,12 are updated, even though they may not be primary indexes.

Index updating 28 is driven off the index keys present at the beginning of the sorted key data set 68. For example, given the sorted key data set 68 shown in FIG. 5, the first three key entries 52 would be read and used to update the index 22 whose internal identification number is 10. The fourth key entry 52 would be read and, as it is does not have a classification of 'INDEX' or 'BOTH', would signal the end of the Index Update phase 28.

Mechanisms by which indexes may be updated from sorted data sets are well known in the art, and are not pertinent to the description of this invention's method of deferred constraint enforcement. As explained in the Sort phase section, it is only necessary that primary indexes be updated prior to performing constraint checking, in order to guarantee insensitivity to the order in which data input records 46 are presented for loading.

The Enforcement Phase 30

The Enforcement phase 30 checks rows of the tables 10, 12 loaded in the Data Load phase 24 for referential integrity constraint violations, and rectifies any such violations found. Rectification consists of deleting the table rows causing referential integrity constraint violations, and deleting any descendents of those rows which were loaded in the Data Load phase 24.

In later phases, input data set records 24 responsible for generating the rows with violations are copied to a discard data set 48, and an error summary report 36 is generated. An additional role of the Enforcement phase 30 is therefore to save information on violations encountered.

Although not critical to the deferred enforcement method of this invention, the diagnostics which can be reported in the error summary report 36 are preferably improved by implementing the Enforcement phase 30 in two distinct subphases: a checking subphase 70 and a rectification subphase 72. These two subphases are discussed in detail below.

The Checking Subphase 70

Figure 6:
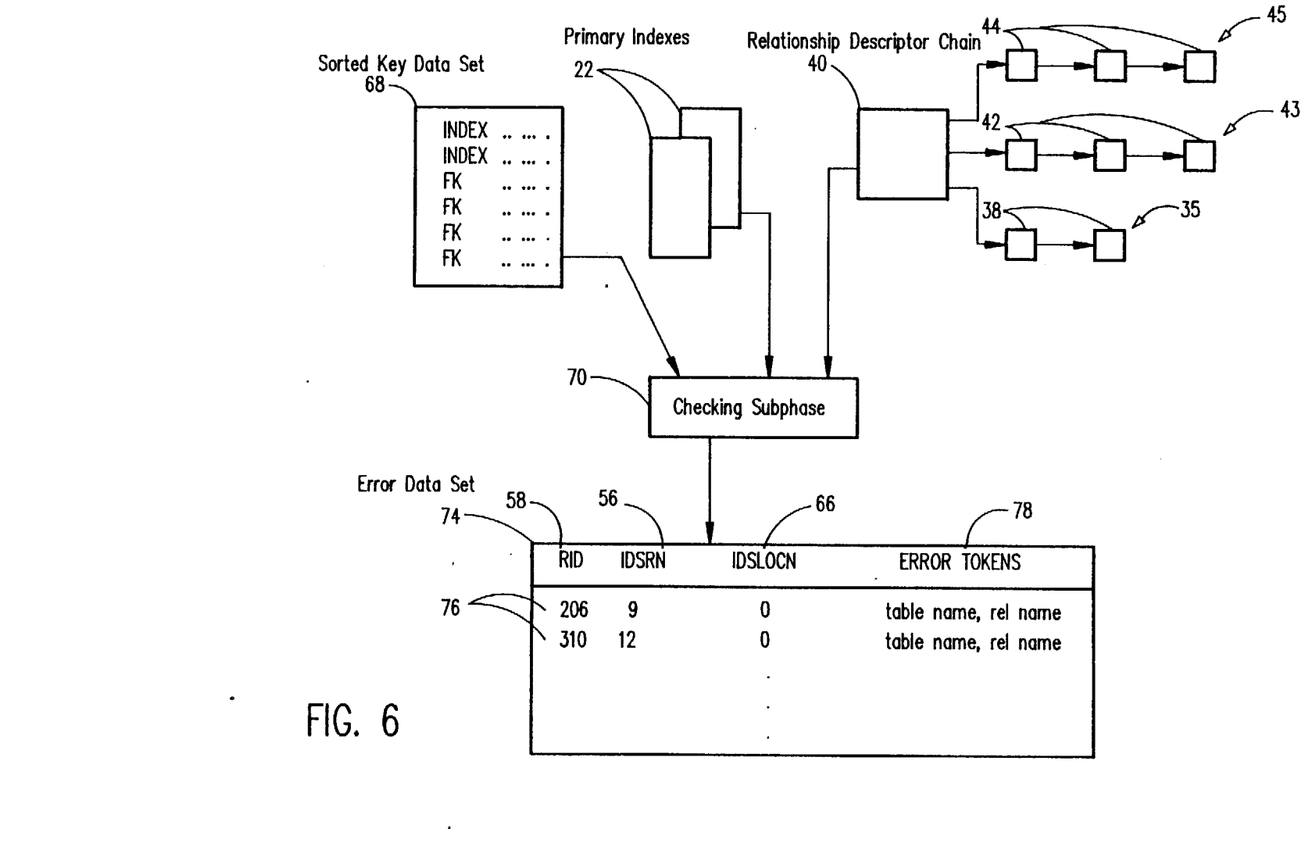
FIG. 6 shows the schematic details of the checking subphase of the enforcement phase of FIG. 3.

As shown in FIG. 6, input to the checking subphase 70 consists of: the sorted key data set 68 produced in the Sort phase 28; the primary indexes 22 for the relationships 38 in which the foreign key values in the key data set 50 participate; and the internal representation of the referential constraints on the tables, i.e., the relationship descriptor chains 39, 43. The relationship descriptor chains 39, 43 are used to translate the relationship OBIDs stored in the foreign key entries 52 into that relationship's primary index OBID, as discussed more fully below.

The output produced by the checking subphase is an error data set 74 which contains an error entry 76 for each referential integrity constraint violation detected. The error data set 74 is used only internally within the Enforcement phase 30 as input to the rectification subphase 72. As shown in FIG. 6, each error entry 76 contains a table row location (RID) 58, an input data set record number (IDSRN) 56, an input data set record location (IDS LOCN) 66, and one or more textual error tokens 78. As described above, the table row location (RID) 58 stores the address of the table row which possesses the referential integrity constraint violation detected. The input data set record number 56 contains the cardinal position in the input data set 46 of the record that generated the table row, and the input data set record location (IDS LOCN) 66 stores the physical location in the input data set 46 of the record The input data set location (IDS LOCN) 66 is stored as 0 to indicate that its value is not known at this time. The textual error tokens 78 are used to generate the error summary report 36.

Pseudocode for the checking process and for constructing the error data set 74 are documented below in Table 3. As indicated therein, each foreign key value 54 in the sorted key data set 68 is evaluated against the primary index 24 that supports the relationship in which the foreign key participates. If a primary key value is found which matches the foreign key value 54, the data row represented by that foreign key entry possesses referential integrity with respect to that constraint. Otherwise, the data row represented has a constraint violation and an error entry 76 is generated.

TABLE 3

| | Pseudocode for the Checking Subphase |
|---|---|
| 301 | Position on first FOREIGN KEY entry in the sorted key data set. |
| 302 | DO UNTIL each foreign key entry has been processed. |
| 303 | Read foreign key entry from key data set. |
| 304 | Locate dependent relationship descriptor with the internal identification number that matches the relationship OBID in the foreign key entry just read. |
| 305 | From the relationship descriptor, determine the internal identification number that identifies the primary index supporting this relationship. |
| 306 | Look in the identified index for a primary key value that matches the foreign key value in the entry being processed. |
| 307 | IF a matching primary key value was found in the index THEN |
| 308 | Do nothing. |
| 309 | ELSE there is a referential integrity constraint violation /= Construct and write an error entry =/ |
| 310 | RID = the RID value in the foreign key entry. |
| 311 | IDSRN = the input data set record number in |

TABLE 3-continued

Pseudocode for the Checking Subphase

|     | the foreign key entry. |
| --- | --- |
| 312 | IDS LOCN = 0 /= unknown at this time =/ |
| 313 | Textual error token = the external name of the relationship. |
| 314 | Write the error entry to the error data set. |
| 315 | END ELSE. |
| 316 | END DO UNTIL each foreign key entry has been processed. |

The error data set 74 produced by the checking subphase 70 becomes input to the rectification subphase 72 discussed below.

The Rectification Subphase 72

Rows introduced in the Data Load phase 24 and determined to have referential integrity constraint violations in the checking subphase 70 are deleted in the rectification subphase 72. New rows which are descendents of such rows are also deleted in a process known as a "cascade delete". At the conclusion of the rectification subphase 72, all data rows loaded in the Data Load phase 24 and remaining in the tables 10, 12 possess referential integrity. The rectification subphase 72 is shown schematically in FIG. 7.

Figure 7:
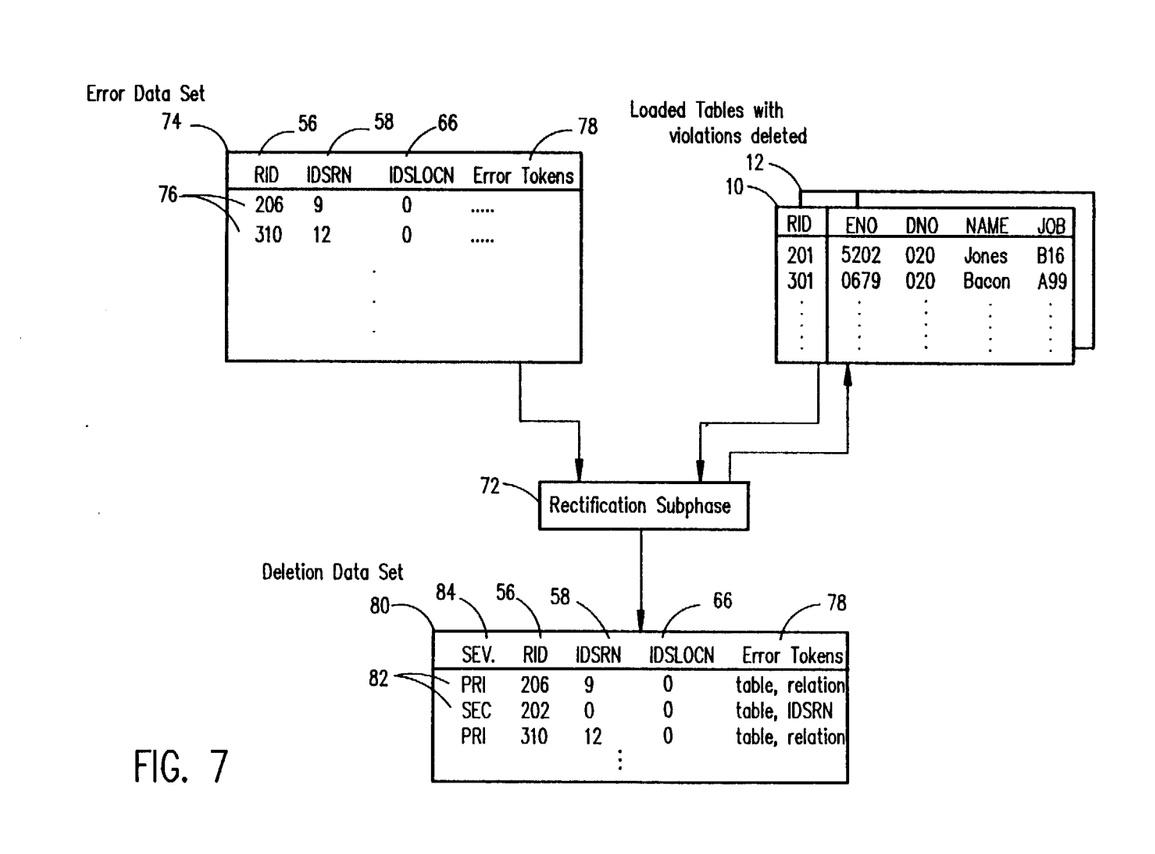
FIG. 7 shows the schematic details of the rectification subphase of the enforcement phase of FIG. 3.

The input to the rectification subphase 72 consists of the error data set 74 produced by the checking subphase 70, and the tables 10, 12 which contain the rows with referential integrity constraint violations. The output produced by the rectification subphase 72 is the tables 10, 12 with their errant rows deleted, and a deletion data set 80 which contains an entry 82 for each errant row. Two types of errant rows are defined—those with primary errors and those with secondary errors. A primary error is a direct referential integrity constraint violation, and records causing primary errors can be said to "initiate" constraint violations. A secondary error is an error by inheritance. Records which are deleted because they are descendents of a row with a referential integrity constraint violation are said to have secondary errors.

The entries 82 placed in the deletion data set 80 each contain an error severity indicator 84, a table row location (RID) 58, an input data set record number (IDSRN) 56, an input data set record location (IDS LOCN) 66, and one or more textual error tokens 78. The error severity indicator 84 indicates whether the row represented by this entry was deleted due to a primary or secondary error, as defined above. The table row location (RID) 58, input data set record number (IDSRN) 56, and input data set record location (IDS LOCN) 66 are as described previously. The textual error tokens 78 depend on whether the error was primary or secondary. For primary errors, the textual error tokens 78 contain the name of the table the input data set record 46 was targeted for, and the name of the relationship whose constraint was violated. For secondary errors, the tokens 78 contain the name of the table the record was targeted for, and the input data set record number (IDSRN) 58 of the primary error that cascaded to create this secondary error.

Pseudocode for the rectification process and its construction of the deletion data set 80 is shown in Table 4. As indicated therein, the data row corresponding to each error data set entry 76 is cascade deleted. For each row deleted (directly or via cascade) an entry 82 is made in the deletion data set 80, which is used as input to the Discard phase 32 discussed below.

TABLE 4

Pseudocode for Rectification Subphase

|     |     |
| --- | --- |
| 401 | DO UNTIL all error entries in error data set have been processed. |
| 402 | Read error entry. |
| 403 | Position on errant data row represented by error entry (its table row location (RID) is in the entry). |
| 404 | Cascade delete the row |
| 405 | DO FOR each row deleted in the cascade delete<br>/= Construct DELETION data set entry =/<br>/= for each row deleted =/ |
| 406 | IF first row (i.e., the one with the error)<br>THEN |
| 407 | Error severity = PRIMARY. |
| 408 | Rest of DELETION entry = same as error entry being processed. |
| 409 | ELSE /= just deleted a secondary error =/ |
| 410 | Error severity = SECONDARY. |
| 411 | RID = table row location (RID) of the record just deleted. |
| 412 | IDSRN = 0, (unknown at this time). |
| 413 | IDS LOCN = 0, (unknown at this time). |
| 414 | Textual error tokens =<br>- name of table from which record was deleted, and<br>- the input data set record number (IDSRN in the error entry being processed) of the primary error that cascaded to create this secondary error. |
| 415 | END ELSE |
| 416 | Write the deletion data set entry to the deletion data set. |
| 417 | END DO FOR each row deleted in the cascade. |
| 418 | END DO UNTIL all error entries have been processed. |

Upon completion of the rectification subphase 72, all data loaded in the Data Load phase 24 and remaining in the tables 10, 12 possess referential integrity. At this point, referential constraint enforcement is complete. The remaining phases, the Discard phase 32 and the Report phase 34, improve the usefulness of the deferred enforcement method. The Discard phase 32 copies input data set 46 records which produced rows lacking referential integrity to a discard data set 48 where they may be corrected and resubmitted to the LOAD process. The Report phase 34 produces a tabular error report summary 36 which provides a guide to the discard data set 48, identifying each record discarded and stating the reason why.

The Discard Phase 32

Figure 8:
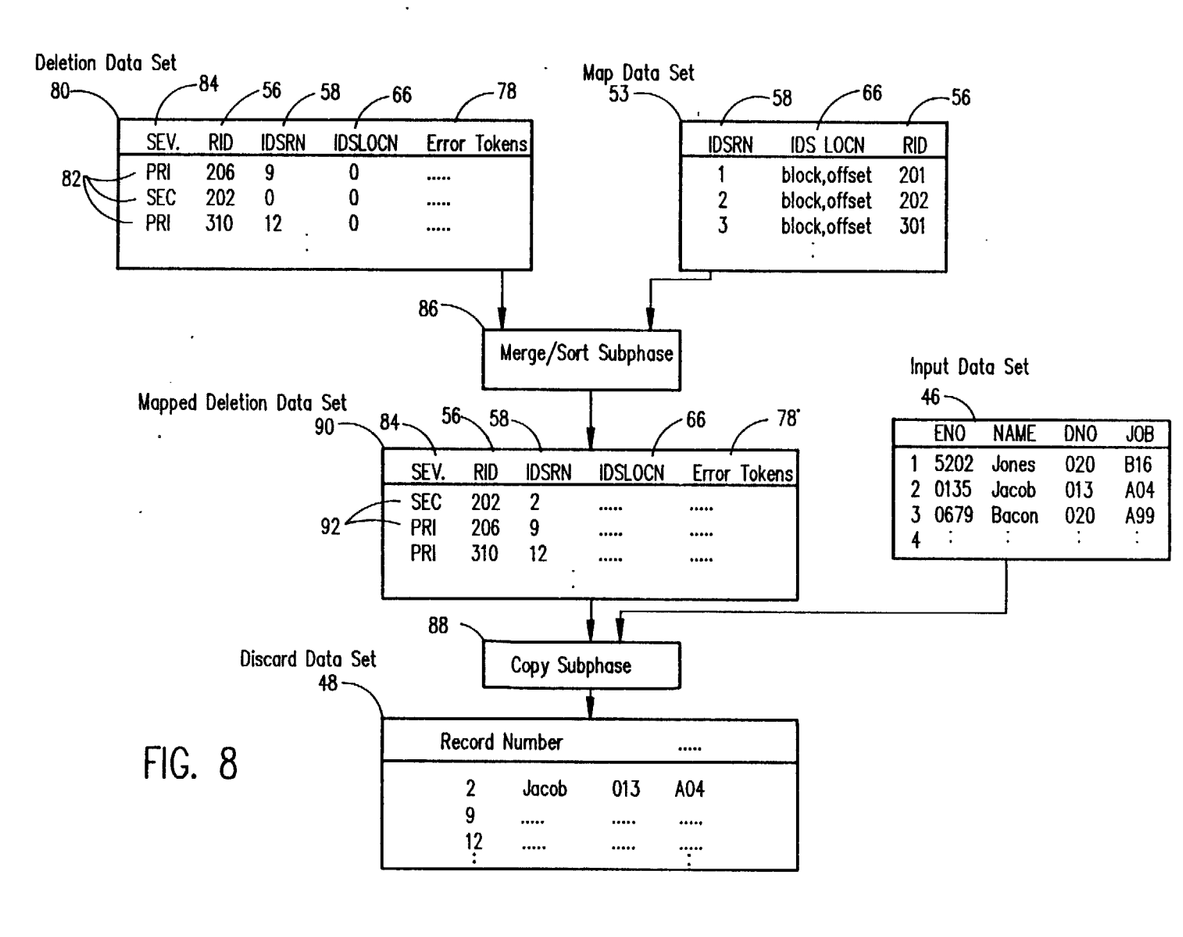
FIG. 8 shows the schematic details of the discard phase of FIG. 3.

During the Discard phase 32, shown schematically in FIG. 8, input data set 46 records are copied to the discard data set 48. The records copied are those which generated table rows that were loaded in the Data Load phase 24 but were subsequently deleted in the Enforcement phase 30 because they contained referential integrity constraint violations or because they were descendents of such rows. The Discard phase 32 actually consists of two subphases: a merge/sort subphase 86 and a copy subphase 88.

The merge/sort subphase 86 merges the entries of the map and deletion data sets 53, 80, and sorts the resulting merge entries to produce a mapped deletion data set 90. This data set 90 is then used by the copy subphase 88 to access the errant records and copy them to the discard data set 48.

Because entries in the deletion data set 80 have a zero (unknown at this time) recorded in their input data set record location (IDS LOCN) field 58, the merge/sort subphase 86 must determine the actual IDS LOCN value before producing the mapped deletion data set 90. The information needed to resolve these unknown IDS LOCN values 66 is stored in the map data set 53 produced during the Data Load phase 24. The merge/sort subphase 86 first sorts the map data set 53 and the deletion data sets 80 by their respective table row location (RID) fields 56. The merge/sort subphase 90 then works through the sorted deletion data set 80. For each entry, the map data set 53 is interrogated using the deletion data set entry's table row location (RID) value 56, and the actual value of the input data set location (IDS LOCN) 66 of the deletion data set entry is retrieved. Having been thus completed, the deletion data set entries 82 are then sorted by their input data set record location (IDS LOCN) 66 to produce the mapped deletion data set 90 for use by the copy subphase 88.

The copy subphase 88 reads the entries 92 in the mapped deletion data set 90 sequentially, fast-forwards into the input data set 46 to the location (IDS LOCN) 66 specified in the entry, and copies the input data set record that it finds there to the discard data set 48. Thus, upon completion of the Discard phase 32, records loaded by the Data Load phase 24 and remaining in the target tables 10, 12 possess referential integrity, and all input data set records which generated rows that violated referential integrity are in the discard data set 48.

Mechanisms for implementing the merge/sort and copy subphases 86, 88 are well known in the art, and are not detailed in this description of the deferred enforcement method.

The Report Phase 34

The Report phase 34 generates a summary error report 36 which informs the user of referential integrity constraint violations encountered during the LOAD operation. The summary report is a guide to the discard data set 48, stating why each record was discarded. Report generators, per se, are well known in the art. Therefore, only the contents of the summary error report 36 are described.

The Report phase 34 uses as input the error-specific tokens 78 in the mapped deletion data set 90 produced in the Discard phase 32. The Report phase 34 sorts the mapped deletion data set entries 92 first by error severity 84 (PRIMARY first, then SECONDARY), and within error severity by input data set record number (IDSRN) 58. This sorting provides that the summary error report 36 first lists those records of the input data set 46 which caused referential integrity constraint violations, allowing the user of this deferred enforcement method to rapidly identify entries in the discard data set 48 requiring correction. Discard data set 48 records having secondary severity errors do not generally require correction, because they were discarded only as the result of a cascade delete initiated by an input data set record with a PRIMARY severity error.

Figure 9:
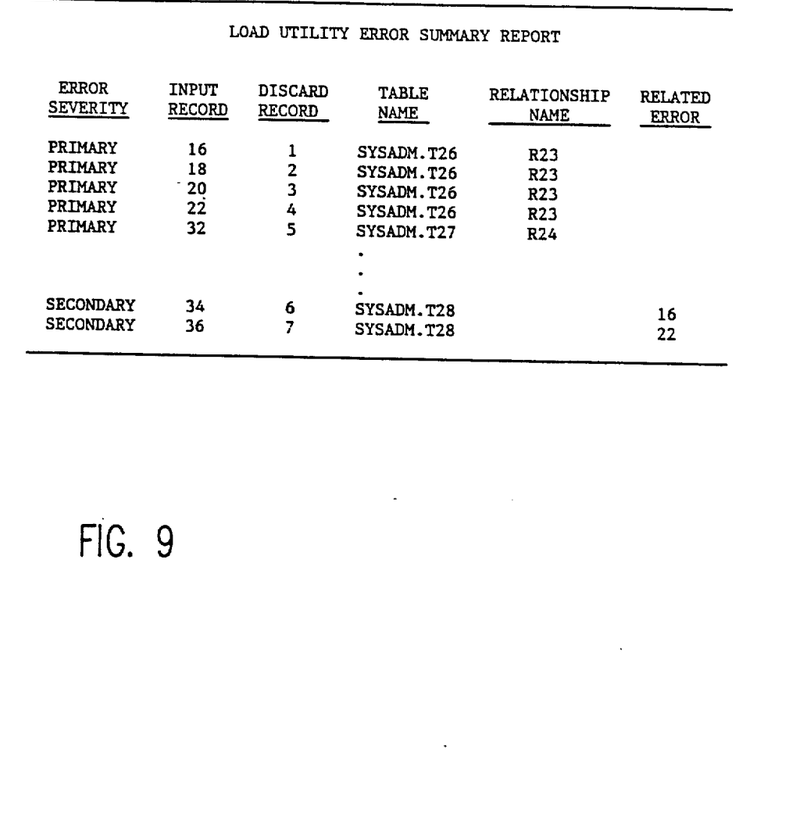
FIG. 9 shows the summary report of FIG. 3.

Each entry in the thus sorted mapped deletion data set generates a line in the summary error report 36 which states the severity of the error (PRIMARY or SECONDARY), the number (IDSRN) 58 of the record in the input data set 46 that generated the error, the number of the discarded record in the discard data set 48, the relationship whose referential constraint was violated (based on the textual error token 78), and for secondary errors the record number (IDSRN) 58 of the input data set record whose primary error caused its deletion (again based on the textual error token). A portion of an error summary report 36 is shown in FIG. 9.

This invention's deferred method offers significant advantages over nondeferred methods which analyze the referential integrity of each record as it is loaded. With this invention, input data records may be presented for loading in any order while still retaining the benefits of optimized constraint enforcement. Nondeferred methods, in contrast, must place restrictions on the order in which parent and dependent records are loaded, or must pay the performance cost of sorting input data prior to loading it. Input data that is related in a cyclic fashion is handled automatically by this invention, while the order imposed by nondeferred methods precludes the loading of cyclic data. The deferred method extracts foreign key values, then sorts them to allow referential integrity checking to proceed in an optimal order. Nondeferred methods check all constraints of a given input record prior to processing the next record. The optimization achieved with the deferred method is therefore not attainable.

It will be understood that, although a specific implementation of the deferred enforcement method of this invention has been described above for purposes of illustration, various modifications may be made without departing from the spirit and scope of the invention. For example, instead of deferring updating of the primary indexes to a separate Index Update phase, the indexes could be updated during the Data Load phase. In that case, the key data set would then consist only of foreign keys. However, it is generally much more efficient to defer updating the indexes as described above. Another alternative to the preferred embodiment would be to perform constraint checking and rectification simultaneously, instead of using separate checking and rectification subphases. In a further alternative to the preferred embodiment of this invention, the primary indexes used to check for primary key values might be replaced by some other "persistent structure" such as a hash table or even a sorted order imposed on a table's rows, provided that such structure was updated to reflect the loaded input data before any referential constraints were checked. Finally, it will be understood that the deferred enforcement method is not limited to operations by which tables are populated, but may readily be applied to other large-scale data base operations. Accordingly, the scope of protection of this invention is limited only by the following claims.

We claim:

1. A method for enforcing referential constraints in a data base management system, comprising the steps performed by a computer of:
   (a) manipulating two or more records of data;
   (b) storing information relating to the records so manipulated and their referential constraints;
   (c) placing in order the stored information of step (b), with information on primary keys preceding information on foreign keys; and
   (d) enforcing the referential constraints using the ordered information of step (c).

2. The method of claim 1, wherein records violating referential constraints are stored separately for future correction and manipulation of the data base.

3. The method of claim 1, wherein the system includes at least one persistent structure useful for checking referential constraints, further comprising the step of:

updating the persistent structure in response to the manipulated data before the step (d) of enforcing the referential constraints.

4. The method of claim 3, wherein the persistent structure is updated in a step subsequent to the step (a) of manipulating data.

5. The method of claim 1, wherein the step (d) of enforcing the referential constraints comprises the steps of:

(d1) identifying violations of the referential constraints; and
   (d2) undoing manipulations causing any such violations.

6. The method of claim 1, wherein records initiating referential constraint violations are reported separately from records violating referential constraints but not initiating such violations.

7. A method for enforcing referential constraints in a relational data base management system having at least one table and at least one index, the method comprising the steps performed by a computer of:

(a) manipulating at least two rows of the table;
   (b) storing information relating to the rows so manipulated and their referential constraints;
   (c) placing in order the stored information of step (b), with information on index keys preceding information on nonindex keys, and with information on primary keys preceding information on foreign keys;
   (d) updating the index using the ordered information of step (c);
   (e) checking for violations of referential constraints by the manipulated rows, using the ordered information of step (c); and
   (f) deleting manipulated rows which violate referential constraints.

8. The method of claim 7, wherein the step (e) of checking for violations uses the updated index.

9. The method of claim 7, wherein the deleted rows are set aside for future correction and manipulation of the data base.

10. The method of claim 7, further including the step of:

(g) reporting the deleted rows and the referential constraints violated by them.

11. The method of claim 7, wherein the manipulating step (a) loads rows into the table.

12. In a relational data base management system having at least one table and at least one index useful for checking referential constraints on the table, an improved method for populating the table with new rows, comprising the steps performed by a computer of:

(a) loading the new rows into the table;
    (b) storing information relating to the new rows and their referential constraints;
    (c) sorting the stored information of step (b) so that information on index keys precedes information on nonindex keys and information on primary keys precedes information on foreign keys;
    (d) updating the index using the sorted information of step (c);
    (e) checking the new rows violating referential constraints, by using the sorted information of step (c) and the updated index of step (d); and
    deleting the new rows which violate referential constraints.

13. The method of claim 12, wherein the deleted rows are discarded for future correction and loading into the data base.

14. The method of claim 12, further including the step of:

(g) generating a report of the deleted rows and the referential constraints violated by them.

* * * * *